United States Patent [19]

Ueda et al.

[11] 4,183,372
[45] Jan. 15, 1980

[54] ALTITUDE COMPENSATION VALVE ASSEMBLY

[75] Inventors: Tatehito Ueda, Susono; Minoru Yamanaka, Toyota; Shoji Ito, Nagoya, all of Japan

[73] Assignees: Aisin Seiki Kabushiki Kaisha, Kariya; Toyota Jidosha Kogyo Kabushiki Kaisha, Toyota, both of Japan

[21] Appl. No.: 784,513

[22] Filed: Apr. 4, 1977

[30] Foreign Application Priority Data

Apr. 5, 1976 [JP] Japan .................................. 51-38551
Apr. 5, 1976 [JP] Japan .................................. 51-38552

[51] Int. Cl.² ........................ F02M 7/12; F16K 17/36
[52] U.S. Cl. ..................................... 137/81; 123/97 B; 137/115
[58] Field of Search ..................... 137/78–81, 137/482; 73/708; 236/92 D

[56] References Cited

U.S. PATENT DOCUMENTS

| | | | |
|---|---|---|---|
| 2,085,303 | 6/1937 | Ernst | 137/115 X |
| 2,437,187 | 3/1948 | Eshbaugh | 137/81 |
| 2,938,528 | 5/1960 | Schmitt | 137/81 X |
| 2,963,034 | 12/1960 | Cummins | 137/81 |

*Primary Examiner*—Martin P. Schwadron
*Assistant Examiner*—Richard Gerard
*Attorney, Agent, or Firm*—Finnegan, Henderson, Farabow & Garrett

[57] ABSTRACT

An altitude compensation valve assembly comprising a housing structure having a bellows and a check valve unit. The check valve unit is supported for movement between a closed position, where communication between a fluid under pressure introduced into an inlet port of the valve assembly is discommunicated from the atmosphere, and an opened position where such communication is established. The check valve unit is normally biased towards the closed position and is moved towards the opened position when the pressure introduced through the inlet port exceeds a predetermined value determined in consideration with change in a altitude in which the valve assembly is operated to compensate for reduction in pressure resulting from change in altitude.

5 Claims, 4 Drawing Figures

ALTITUDE COMPENSATION VALVE ASSEMBLY

BACKGROUND OF THE INVENTION

The present invention relates to the construction of an altitude compensation valve assembly for use in a fluid operated system.

The U.S. Pat. No. 3,456,632, patented on July 22, 1969, for example, discloses an altitude compensation valve assembly operatively coupled to a carburetor throttle valve for controlling the throttle valve opening during high manifold vacuum low pressure resulting from variation in altitude of the internal combustion engine. The altitude compensation valve assembly disclosed in this U.S. patent comprises a housing having first and second working chambers, the first working chamber accommodating therein a sealed evacuated bellows and being in communication with the engine intake manifold downstream of the throttle valve. The bellows used therein is made of resilient metallic material and, therefore, tends to expand axially by the action of the resiliency of the metallic material for the bellows. A wall dividing the interior of the housing into the first and second working chambers has a valve stem extending therethrough, said valve stem having one end positioned adjacent an end plate secured to the bellows, the other end of which valve stem carries a valve member normally closing a passage defined in the wall around the valve stem and communicating between the first and second working chambers when the valve is opened. This altitude compensation valve assembly is so designed that, when the manifold pressure in the first working chamber falls below a predetermined value during, for example, deceleration of the internal combustion engine, the bellows expands with the end plate pushing the valve stem, thereby causing the valve member to open the passage. As the passage between the first and second working chambers is opened, the manifold pressure is also developed in the second working chamber and, therefore, an operating rod having one end coupled to the throttle valve and the other end situated within the second working chamber is drawn against a spring biasing force to open the throttle valve. On the other hand, as the manifold pressure increases over the predetermined value, the altitude compensation valve assembly operates in a reverse manner.

While the altitude compensation valve assembly of the above mentioned U.S. patent is satisfactory in that the position of the throttle valve of the carburetor can be adjusted to control the quantity of combustible mixture admitted to the combustion chamber of the engine during deceleration regardless of the altitude or the environment in which the engine is operated, an apparent disadvantage has been found in that it requires a precise adjustment of the bellows in consideration of the equilibrium of the pressure in the first working chamber, the internal pressure in the bellows and the resiliency of the metallic material for the bellows. Moreover, it has been found that, because of the construction of the valve assembly requiring a mechanical linkage between the valve assembly and a device whose operation or position is to be controlled thereby, it has a limited range of application.

SUMMARY OF THE INVENTION

Accordingly, the present invention has been developed in view to substantially eliminating the above described disadvantages and inconveniences inherent in the prior art altitude compensation valve system and is intended to provide an improved altitude compensation valve assembly capable of controlling a fluid under pressure to a predetermined constant value irrespective of the altitude in which the system is operated.

BRIEF DESCRIPTION OF THE DRAWING

The present invention will be hereinafter described in connection with preferred embodiments thereof with reference to the accompanying drawings, in which.

DETAILED DESCRIPTION OF THE INVENTION

Before the description of the present invention proceeds, it is to be noted that like parts are designated by like parts throughout the accompanying drawings.

Figure 1:
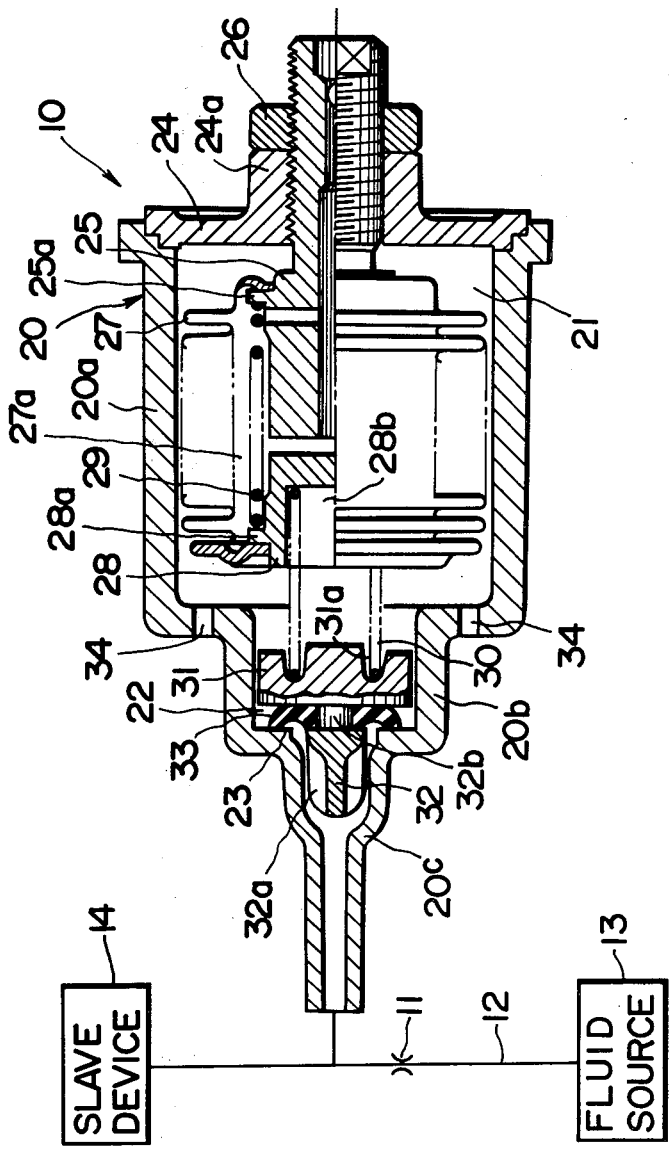
FIG. 1 is a longitudinal sectional view of an altitude compensation valve assembly according to a first preferred embodiment of the present invention.

Referring now to FIG. 1, there is shown an altitude compensation valve assembly 10 shown to be disposed on a fluid passage 12 extending from a source 13 of fluid under pressure, for example, a compressed air, to a slave device 14, for example, a fuel injection system for an automobile internal combustion engine, the operation of which slave device 14 is to be controlled by the fluid under pressure from the fluid source 13. This altitude compensation valve assembly 10 is positioned downstream of a constricted area or orifice 11 in the passage 12.

The altitude compensation valve assembly 10 so disposed comprises a substantially cylindrical housing 20 constituted by a large internal diameter portion 20a, defining therein a bellows chamber 21, and a reduced diameter portion 20b of the diameter smaller than that of the large diameter portion 20a, which portion 20b is integrally formed at one end with the large diameter portion 20a in coaxial relation to the longitudinal axis of the latter. The reduced diameter portion 20b of the housing 20 defines therein a valve chamber 22 having one opened end in communication with the bellows chamber 21 and the other end adapted to be communicated to the passage 12 downstream of the orifice 11 through a conduit portion 20c having one end integral with the reduced diameter portion 20b and the other end adapted to be coupled to the passage 12 through any suitable coupling means (not shown). It is to be noted that the internal diameter of at least one end of the conduit portion 20c adjacent the reduced diameter portion 20b is so smaller than the internal diameter of that portion 20b as to provide an annular shoulder 23 which serves as a valve seat as will be described in more detail later. Housing portion 20c constitutes a first chamber and housing portions 20a and 20b constitute a second chamber in the embodiment depicted in FIG. 1.

The housing 20 includes an end cap 24 rigidly and tightly secured to an open end of the portion 20a opposite to the reduced diameter portion 20b. Axially adjustably supported in an apertured projection 24a outwardly protruding from the end cap 24 is a fixed retainer 25 of substantially elongated configuration in the chamber 21 which has an outer threaded end portion having a lock nut 26 threadably mounted thereon for avoiding any accidental loosening of that outer threaded end portion of the fixed retainer 25, the opposite inner end portion being situated within the bellows chamber 21 in a manner as will subsequently be described.

Disposed within the bellows chamber 21 is a bellows 27 having one end mounted on and rigidly and tightly secured to the inner end portion of the fixed retainer 25 through a radially outwardly extending flange 25a integral with the fixed retainer, the other end of the bellows 27 being mounted on and rigidly and tightly secured to a floating retainer 28 through a radially outwardly extending flange 28a integral with said floating retainer 28. The bellows 27 may be made of any suitable resilient material, preferably, a conventional thin metallic material, and has a sealed internal chamber 27a which has been evacuated to very low pressure, for example, a $10^{-2}$ mmHg. Mounted on the inner end portion of the fixed retainer 25 and a portion of the floating retainer 28 and extending between the flanges 25a and 28a respectively on said retainers 25 and 28 is a coiled spring member 29, for example, a compression spring, biasing the floating retainer 28 to move away from the fixed retainer 25 and, therefore, the bellows 27 to expand axially.

The floating retainer 28 has an axially inwardly extending recess 28b and is supported in position by a compression spring 30 having one end inserted into the axially inwardly extending recess 28b in the floating retainer and the other end engaged to a check valve unit of a construction which will now be described.

The check valve unit in the embodiment of FIG. 1 comprises a substantially disc-shaped block 31 housed within the valve chamber 22 and having one end formed with an annular groove 31a receiving therein that end of the compression spring 30 and the other end integrally formed, or otherwise rigidly connected with a projection 32. The projection 32 has one end situated within the conduit portion 20c and axially splined to provide a plurality of axial passages, the other end of which projection is reduced in diameter at 32b to provide an annular groove for the support of an annular valve member 33 of an electric material such as a synthetic or natural rubber. While the check valve unit is so constructed as hereinbefore described, it will readily be seen that the compression spring 30, exerting a greater expanding force than that exerted by the spring member 29 plus the resiliency of the material for the bellows 27, biases the check valve unit and the floating retainer 28 in the opposite directions away from each other with an annular outer peripheral edge of the valve member 33 tightly engaging the annular shoulder 23, thereby interrupting communication between the interior of the conduit portion 20c and the valve chamber 22. The valve chamber 22 is, as hereinbefore described, communicated to the bellows chamber 21 which is in turn communicated to the atmosphere through one or more vent holes 34 shown to be defined in an axially extending annular wall at the boundary between the portions 20a and 20b of the housing 20. It is, therefore, clear that the bellows chamber 21 has a pressure equal to the atmosphere pressure because of the presence of the vent holes 34.

The altitude compensation valve assembly of the above described construction is so designed that, when the fluid under pressure, that is, the compressed air, introduced into the conduit portion 20c attains a value sufficient to overcome the sum of the atmospheric pressure plus the axially expanding force of the compression spring 30, the check valve unit is moved against the compression spring towards the right as viewed in FIG. 1 with the outer peripheral edge of the valve member 33 separating away from the annular shoulder, thereby establishing communication between the conduit portion 20c and the bellows chamber 21 by way of the valve chamber 21. Therefore, the incoming pressure introduced into the conduit portion 20c is vented to the atmosphere through the vent holes 34. On the other hand, if the incoming pressure falls below a predetermined value, the check valve unit which has been moved towards the right is forced to move to the left by the action of the compression spring 30 with the outer peripheral edge of the valve member 33 tightly engaging the annular shoulder 23, thereby interrupting the once-established communication between the conduit portion 20c and the bellows chamber 21. From the foregoing, it will readily be seen that variation of the incoming pressure over and below the predetermined value at which the check valve unit is operated results in communication and discommunication between the conduit portion 20c and the atmosphere whereby the fluid under pressure flowing in the passage 12 can be maintained at a predetermined or desired value.

It is, however, to be noted that the pressure within the bellows chamber 21, that is, the atmospheric pressure, decreases as the altitude in which the system is operated becomes high such as in mountainous regions. In such condition, the bellows 27 expands axially outwards in response to variation in altitude, more particularly, in response to variation in pressure within the bellows chamber 21, to cause the compression spring 30 to be axially inwardly compressed to incrementally increase the biasing force acting on the check valve unit. Therefore, by suitably selecting the compression spring 30 in consideration of a maximum possible quantity of change in altitude the sum of the pressure within the bellows chamber 21 and the biasing force of the compression spring 30, which acts on the check valve unit so as to discommunicate between the conduit portion 20c and the atmosphere by way of the bellows chamber 21 can be maintained at a constant value irrespective of the altitude. That is to say, the biasing force of compression spring 30 varies with change in altitude in such a manner as to increase with increase of the altitude and, hence, with decrease of the atmospheric pressure. In view of the foregoing, it is clear that, irrespective of the change in pressure within the bellows chamber 21, that, is the atmospheric pressure, the pressure of the fluid flowing through the passage 12 can be maintained at the predetermined or desired value and therefore the slave device 14 can be operated by the fluid whose pressure is of a constant value irrespective of the altitude.

Figure 2:
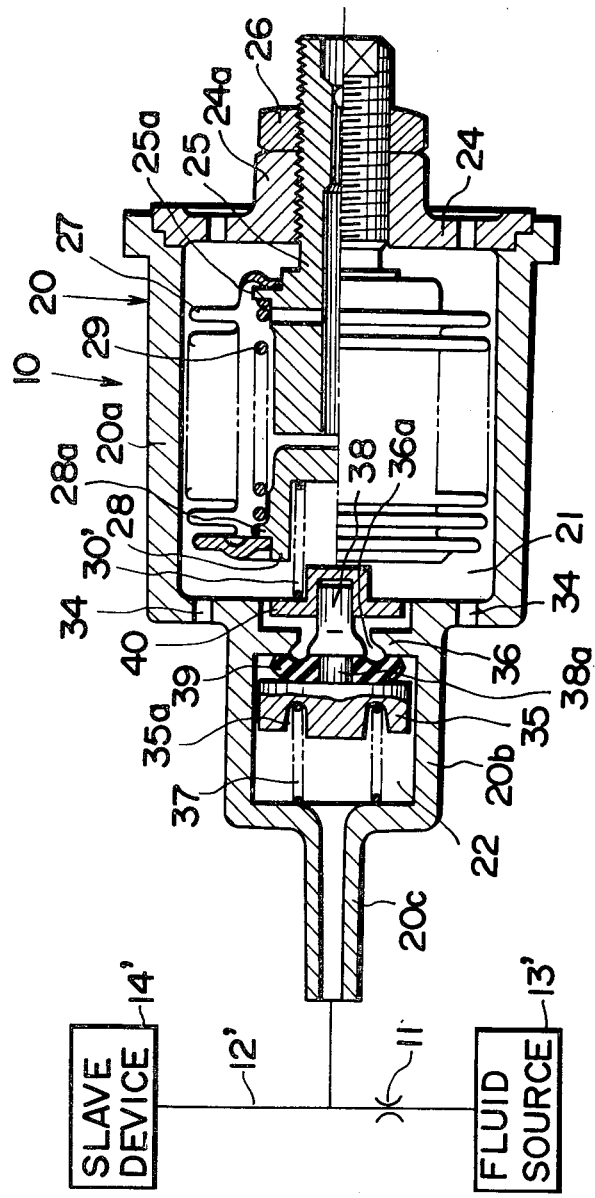
FIG. 2 is a view similar to FIG. 1, showing an altitude compensation valve assembly according to a second preferred embodiment thereof.

While in the embodiment of FIG. 1, the pressure necessary to move the check valve unit to an opened position against the compression spring 30 plus the atmospheric pressure present within the bellows chamber 21 is a positive pressure, the check valve unit employed in the embodiment of FIG. 2 may be moved to the opened position by the application of a negative pressure. It is to be noted that a difference between the altitude compensation valve assembly of FIG. 1 and that of FIG. 2 resides in the check valve unit, reference will now be made only to the check valve unit.

Referring now to FIG. 2, the altitude compensation valve assembly 10 is shown to be disposed on the fluid passage 12' with the conduit portion 20c fluid-connected to said passage 12' on one of the sides of the orifice 11 adjacent the slave device 14', which passage 12' extends between a source 13' of low pressure, for example, an intake manifold extending between an automobile carburetor and an internal combustion engine, and the slave device 14' to be operated by the low pressure developed by the pressure source 13'. The check valve unit employed in the altitude compensation valve assembly shown in FIG. 2 for selectively communicating and discommunicating between the conduit portion 20c and the bellows chamber 21 comprises a substantially disc-shaped block 35 having an outer peripheral face formed with a plurality of axially splined grooves to provide a passage, and axially slidably housed within the valve chamber 22 which is partitioned from the bellows chamber 21 by an apertured wall 36 having a central aperture 36a defined therein. The disc-shaped block 35 has one end formed with an annular groove 35a receiving therein one end of a compression spring 37, the other end of which is so engaged to an annular wall at the boundary between the conduit portion 20c and reduced diameter portion 20b of the housing 20 that the block 35 is, so far described, forced to move towards the right as viewed in FIG. 2. Housing portions 20b and 20c constitute a first chamber and housing portion 20a constitutes a second chamber in the embodiment depicted in FIG. 2. The other end of the disc-shaped block 35 has a projection 38 rigidly connected or otherwise integrally formed therewith and terminating within the bellows chamber 21 through the aperture 36a in the wall 36. This projection 38 is reduced in diameter at 38a adjacent the block 35 to provide an annular groove for the support of an annular valve member 39 of an elastic material. Mounted on the free end of the projection within the bellows chamber 21 is a spring seat 40 to which one end of a compression spring 30' is engaged, the opposite end of said compression spring 30' being received in the recess 28b in the floating retainer 28 as hereinbefore described in connection with the foregoing embodiment of FIG. 1.

It is to be noted that the compression spring 37 is so selected to be of a type capable of exerting a greater axially outwardly biasing force than that of the compression spring 30' for a given low pressure developed in the valve chamber 22 at the altitude equal to or approximating to the sea level that the check valve unit is held in position to close the aperture 36a with an outer peripheral edge of the valve member 39 tightly engaged to the wall 36 as shown at the altitude equal to or approximating to the sea level.

Therefore, it will readily be seen that, even if the value of the negative pressure relative to atmospheric pressure within the valve chamber 22 at which the check valve unit starts to move towards the left against the compression spring 37 at the altitude equal to or approximating sea level is reduced with increase of the altitude, this reduction can advantageously be compensated for by the bellows 27 then axially outwardly expanding to increase the axially outwardly biasing force of the compression spring 30' acting on the check valve unit so as to move the latter towards the left. This means that the force necessary to cause the check valve unit to communicate the valve chamber 22 to the bellows chamber 21 and, hence, the atmosphere is constant irrespective of the altitude and, therefore, the low pressure in the passage 12' can be maintained at a constant value irrespective of the altitude.

In practice, the altitude compensation valve assembly of the construction shown in FIG. 1 may be used in a fluid operated system shown in FIG. 3 according to the present invention, reference to which will now be made.

Figure 3:
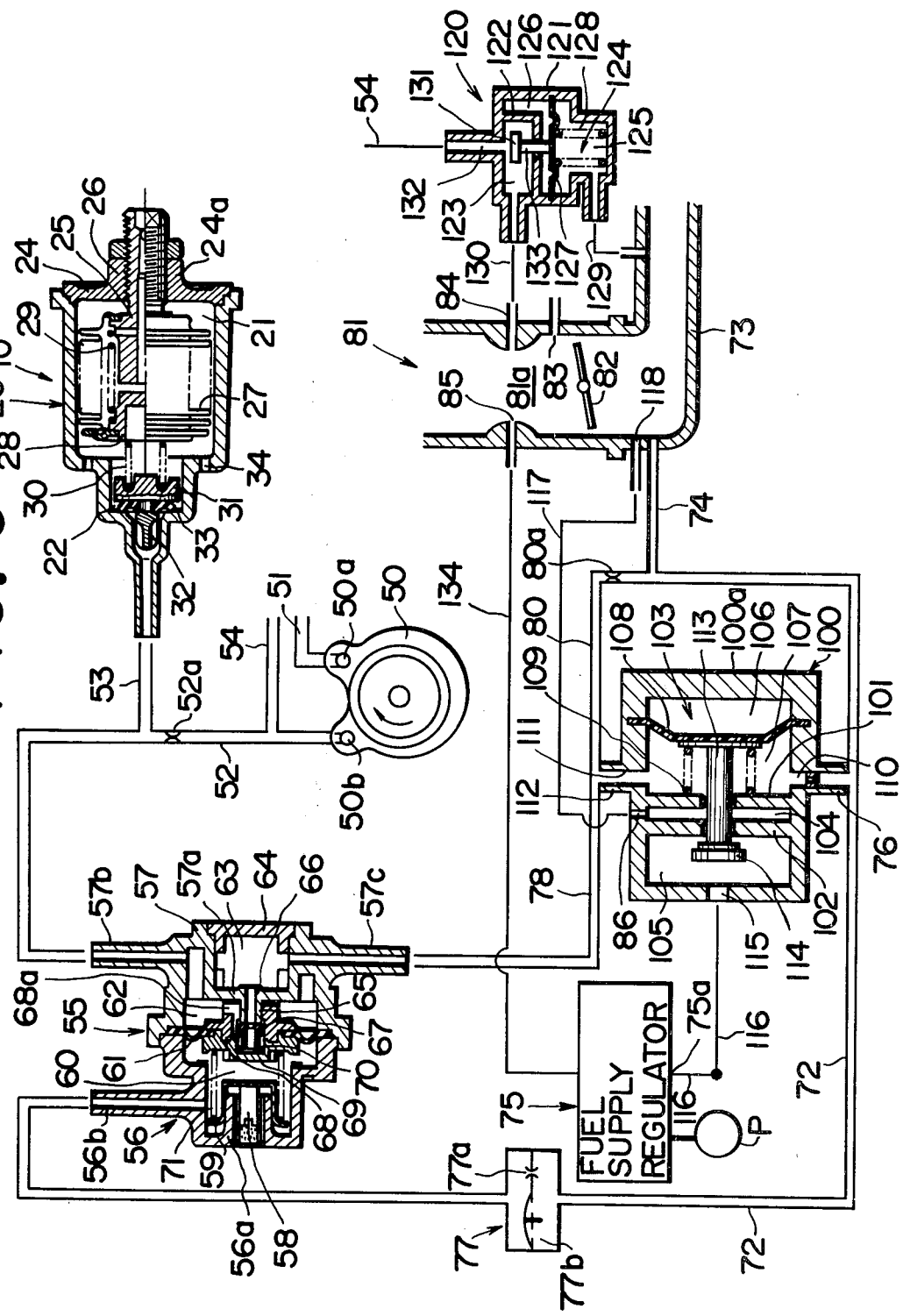
FIG. 3 is a schematic diagram showing an automobile fuel injection system employing the altitude compensation valve assembly shown in FIG. 1.

Referring to FIG. 3, shown is an automobile fuel supply system which comprises a source of compressed air including an air pump 50 having an inlet 50a communicated to the atmosphere through an air cleaner (not shown) by way of a pipe 51 and an outlet 50b coupled to a control valve assembly of a construction as will be described later through a supply pipe 52. The supply pipe 52 has a constricted area or orifice 52a defined therein. A portion of the pipe 52 on one of the opposite sides of the orifice 52a adjacent the control valve assembly is coupled to the conduit portion 20c of the altitude compensation valve assembly directly or through a connection pipe 53 and another portion of the pipe 52 on the other of the opposite sides of the orifice 52a adjacent the air pump 50 is connected with a pipe 51 which is in turn connected in a manner as will be described later.

It is to be noted that the air pump is operatively coupled to a power output shaft of an automobile internal combustion engine (not shown) so that the compressed air emerging from the outlet 50b of said air pump 50 flows through the supply pipe 52 under a pressure proportional to the number of revolution of the engine. Therefore, the pressure introduced into the conduit portion 20c of the altitude compensation valve assembly 10 is proportional to the number of revolution of the combustion engine.

The control valve assembly referred to above is identified by 55 and comprises first and second housing 56 and 57 rigidly connected to each other in alignment with each other. The housing 56 has an axially inwardly extending sleeve portion defined at 56a and through which an adjustment screw 58 adjustably extends. Mounted on and surrounding the sleeve portion 56a and engaged to an inner end of the adjustment screw 58 is a spring seat member 59. This first housing 56 has a first intake port 56b communicated to a first working chamber 60 which is defined within the first housing 56 in cooperation with an annular diaphragm member 61 supported in position in a manner as will be described later.

On the other hand, the second housing 57 has a second working chamber 62, which is defined in cooperation with the annular diaphragm member 61, and an inwardly recessed end wall defined at 57a, the recess in said end wall 57a defining a third working chamber 63 in cooperation with an end cap 64 tightly secured to the opening of the recess or the third working chamber 63. The second housing 57 has a second intake port 57b in communication with the second working chamber 62 and an outlet port 57a in communication with the sealed third working chamber 63.

The wall 57a is apertured at its central portion in alignment with the longitudinal axis of any one of the first and second housings 56 and 57 and has a support sleeve 65 having one end connected or otherwise integrally formed with said wall 57a, a substantially intermediate portion of said support sleeve 65 extending in a direction opposite to the third working chamber 63. The support sleeve 65 has an axially extending passage 66 having one end opening into the third working chamber 63 through the aperture in the wall 57a and the other end adapted to be communicated to and discommunicated from the second working chamber 62 selectively by a valve member 67 supported in a manner which will now be described.

Movably mounted on the support sleeve 65 is a cylindrical flanged retainer member 68 having one end formed at 68a with one or more radially extending grooves and the other end to which a mating flanged retainer member 69 is rigidly connected.

The annular diaphragm member 61 referred to above has an outer peripheral portion firmly sandwiched between the first and second housings 56 and 57 while an inner peripheral portion of said diaphragm member 61 is firmly sandwiched between the flanges of the respective retainer members 68 and 69 as shown, thereby partitioning the first and second working dhambers 60 and 62.

Within a space defined in the retainer members 68 and 69 in cooperation with the other end of the support sleeve 65, there is disposed a compression spring 70 having one end engaged to the retainer member 69 and the other end engaged to the valve member 67. A compression spring 71 is housed within the first working chamber 60 and has one end engaged to the seat member 59 and the other end engaged to the retainer member 69 so that the retainer members 68 and 69 are biased towards the right as viewed in FIG. 3, that is, in a direction close to the wall 57a. With the retainer members 68 and 69 so biased by the compression spring 71, the valve member 67 is also biased by the compression spring 70 to a closed position in which the passage 66 is closed so that the second and third working chambers 62 and 63 are discommunicated from each other.

In the construction so far described, the control valve assembly is operable in such a manner that, when the low pressure within the first working chamber 60 falls below a predetermined value, the retainer members 68 and 69 are moved towards the left against the compression spring 71 together with the valve member 67. As the valve member 67 is moved together with the retainer members 68 and 69 then moving towards the left against the compression spring 71, the passage 66 is opened to eatablish communication between the second and third working chambers 62 and 63 so that the pressure introduced into the second working chamber 62 through the second intake port 57b can be discharged from the outlet port 57c through the third working chamber 63. It is to be noted that the predetermined value at which the retainer members 68 and 69 are moved towards the left together with the valve member 67 is, since the pressure introduced into the second working chamber 62 is altitude compensated by the altitude compensation valve assembly 10, a constant value determined by the compression spring 71 and the pressure within the second working chamber 62 irrespective of the altitude.

While the control valve assembly 55 is constructed as hereinbefore fully described, the first intake port 56b is connected to a pipe 72 having one end in communication with said intake port 56b and the other end in communication with the intake manifold 73 by means of a pipe 74 and also a vacuum controlled valve 100.

The vacuum controlled valve 100 comprises a cylindrical hollow housing 100a which contains therein two internal transverse walls 101, 102 that divide the interior of the housing 100a into three chambers 103, 104, 105. The first chamber 103 is further divided into two chambers 106, 107 by a flexible diaphragm 108 disposed therein. A spring 109 is biased against the wall 101 and presses against the diaphragm 108 to urge it to expand away from the wall 101. The housing 100a has an inlet port 110 inter-communicating through a pipe 76 having therein an orifice as shown in FIG. 3 with the pipe 72 and the chamber 107 and inlet port 111 communicating through a pipe 112 with the pipe 78 and the chamber 107. Thus, the low pressure introduced through the pipe 76 into the chamber 107 causes the diaphragm 108 to move leftwards and the constant pressure introduced through the pipe 112 into the chamber 107 causes the diaphragm to move rightward. The diaphragm 108 is provided with a valve stem 113 extending through openings formed in the walls 101, 102, which stem has at one end a valve head 114 positioned in the chamber 105. The chamber 105 is communicated through a port 115 to a conduit 116 connected to a fuel pump (P) and also through a passage defined in the fuel supply regulator 75 which is in communication with wall 102 to the chamber 104 which has a port 86 which is connected to a conduit 117 leading to a slow jet supply port 118.

When the low pressure, whose value drops below a predetermined value determined depending upon the urging force of the spring 109, is introduced through the pipes 74, 72 and 76 from the intake manifold 73 into the chamber 107, the diaphragm 108 is shifted leftwards to open the valve 114 so that the fuel is supplied to the slow jet port 118 through the pipe 116, the chamber 105, the passage in the wall 102, the chamber 104 and the conduit 117. However, when the regulated pressure in the pipe 78 is introduced through the pipe 112 into the chamber 107, the diaphragm 108 is moved rightwards to close the valve 114 so that communication between the fuel pump and the slow jet supply port 118 is interrupted.

The pipe 72 has a transmission valve unit 77 disposed thereon, which valve unit 77 includes an orifice 77a for retarding the time required for the pressure from the intake manifold 73 to be transmitted to the first working chamber 60 of the control valve assembly 55 and a check valve 77b for preventing the flow of the pressure from the control valve assembly 55 into the intake manifold 73.

The second intake port 57b of the control valve assembly 55 is communicated to the supply pipe 52.

The outlet port 57c of the control valve assembly 55 is communicated to the pipe 78 which is in turn connected to the vacuum controlled valve 100 and also to the pipe 74 by way of a pipe 80 having a constricted area or orifice 80a defined therein.

An automobile carburetor 81 is shown to have an intake passage 81a having one end communicated to the atmosphere through the air cleaner (not shown) and the other end in communication with the intake manifold 73 leading to at least one combustion chamber of the internal combustion engine as is well known to those skilled in the art. This carburetor 81 is also shown to have a known throttle valve 82 for regulating the opening of the intake passage 81a in the carburetor 81.

As is well known to those skilled in the art, the throttle valve 82 is operatively connected to an acceleration pedal (not shown) and, depending on the position of the acceleration pedal, the throttle valve 82 is rotated to adjust the opening of the intake passage 81a. The pressure developed within the intake passage 81a in the carburetor 81 is present in the vicinity of an advance port 83 which is connected to a distributor (not shown) as is well known to those skilled in the art. A port 84 opening in the carburetor 81 towards the intake passage 81a is connected to the air pump 50 through the pipe 54 and a vacuum controlled valve 120 for introducing into the carburetor a fluid under pressure in response to deceleration of the internal combustion engine.

The vacuum controlled valve 120 comprises a substantially cylindrical housing 121 which contains therein an internal wall 122 that divides the interior of the housing 120 into two chambers 123, 124. The chamber 124 is further divided into chambers 125, 126 by a diaphragm 127 disposed therein. A spring 128 is based against the wall of the housing 121 and presses against the diaphragm 108 to urge it to expand away from the wall. The chamber 125 is communicated through a pipe 129 to the intake manifold 73. The pipe 129 may have the transmission valve unit the construction of which may be the same as that of the unit 77. The chamber 123 in the housing 120 is communicated through the pipe 54 to the air pump 50 and through a pipe 130 to the port 84 the diaphragm 127 is provided with a valve stem 133 extending through an opening formed in the wall 122, which stem has at one end a valve head 131 arranged in the chamber 123 in alignment with a port 132. When the pressure in the intake manifold 73 drops below a predetermined value depending upon the biasing force of the spring 128 and this low pressure overcomes the urging force of the spring 128, the diaphragm with the valve stem 133 is moved downwards to open the port 132 so that air is supplied from the air pump 50 to the port 84 through the pipe 54 and the valve 120. On the other hand, when the pressure introduced into the chamber 125 exceeds the predetermined value, the biasing force of the spring 128 and the increased pressure in the chamber 125 cause the diaphragm 127 to move upwards as viewed in FIG. 3, thereby closing the valve 131 so as to establish the discommunication of the air pump 50 and the port 85 by way of the port 132. It will be understood that the supply of air from the air pump 50 to the port 84 is controlled depending upon the variation of pressure developed in the intake manifold 73.

The fuel supply regulator 75 has a fuel inlet port 75a connected to a fuel pump. It is also well known to those skilled in the art that the regulator 75 is so designed that the fuel inlet port 75a of the regulator 75 is communicated to a main fuel supply port 85 through a conduit 134. By way of example, in a known vehicle driven by a LPG-operated engine, wherein the throttle valve is fully opened to permit a relatively large amount of air to be admixed with a fuel being introduced into the intake manifold during the start of operation of the LPG-operated engine at a cold climate, the amount of the air-fuel mixture to be supplied is determined by the adjusted opening of the throttle valve. In such conventional LPG-operated engine, there is the possibility that, during idling, the engine tends to become inoperative. However, in order to avoid this possibility, it is well known to provide a low speed fuel supply passage opening into the intake manifold separately of the main fuel supply passage, through which low speed fuel supply passage an additional amount of fuel is supplied to the air-fuel mixture by the action of the low pressure developed in the intake manifold.

The fuel supply regulator 75 employed in the present invention includes the main fuel supply port 86 which is communicated to a main fuel supply port 85 opening in the carburetor 81 into the intake passage 81a.

While the system shown in FIG. 3 is constructed as hereinbefore described, when the engine is decelerated with the throttle valve 82 substantially closed, the pressure within the intake manifold 73 is decreased. The decreased pressure is transmitted to the transmission valve unit 77 by means of the pipes 74 and 72. However, if the decrease of the pressure takes place for a relatively short period of time, this decreased pressure is not transmitted to the control valve assembly 55 because of the presence of the orifice 77a. On the contrary thereto, the deceleration continues for a relatively long period of time, for example, because the vehicle equipped with the system shown in FIG. 3 is running downwards on a slope, the low pressure within the intake manifold 73 is transmitted to the first intake port 56b and then into the first working chamber 60 of the control valve assembly 55. The low pressure so introduced into the first working chamber 66 draws the retainer members 68 and 69 in a direction away from the wall 57a against the compression spring 71. As the retainer members 68 and 69 are so moved, the valve member 67 is also moved towards the left together with said retainer members 68 and 69, the consequence of which is that the pressure within the second chamber 62 is allowed to enter the third working chamber 63 through the passage 66. The constant pressure within the third working chamber 63 is then supplied through the outlet port 57c by way of the pipe 78 to the vacuum control valve so that the low speed fuel supply system is rendered inoperative. This in turn results ultimately in reduction of the amount of noxious unburned components, such as CO and/or HC, contained in exhaust gases emitted from the internal combustion engine.

Figure 4:
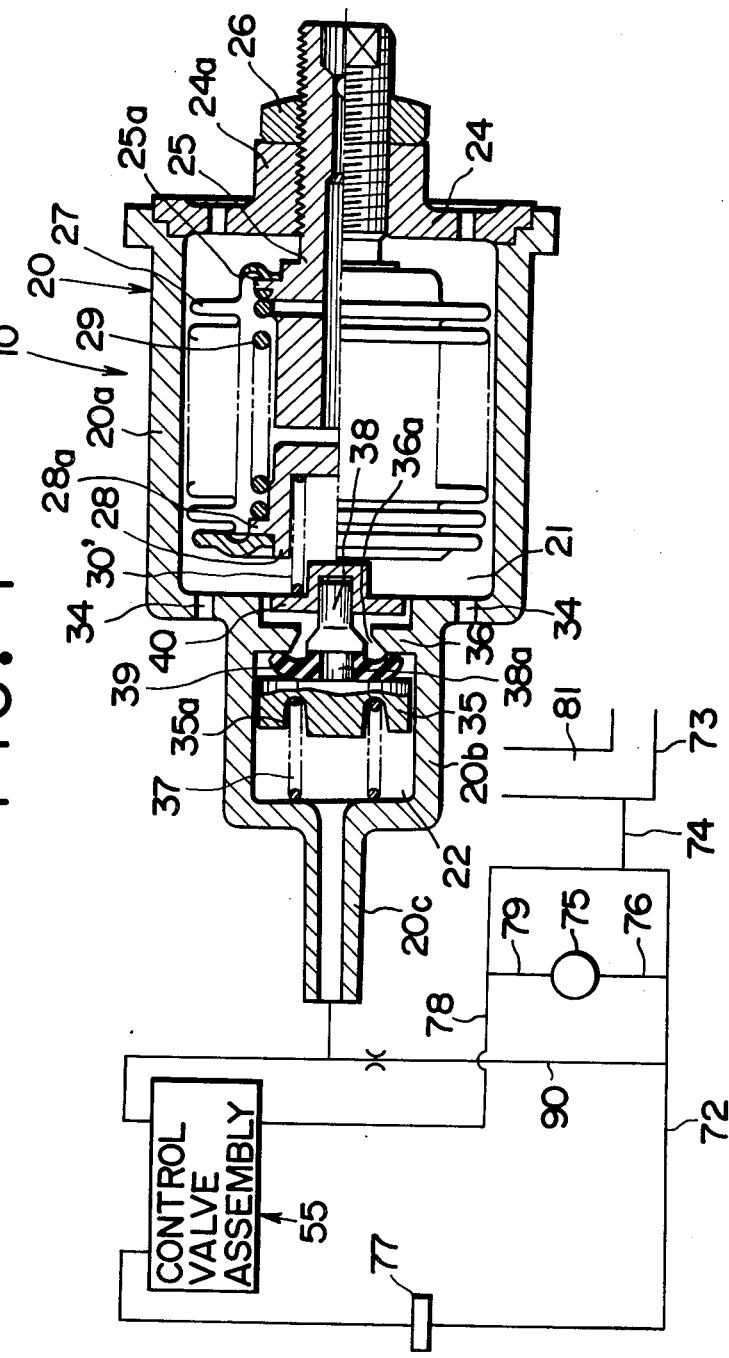
FIG. 4 is a diagram similar to FIG. 3, but showing the system employing the altitude compensation valve assembly of the construction shown in FIG. 2.

The altitude compensation valve assembly of the construction shown in FIG. 2 may be employed in the system shown in FIG. 4. In the embodiment shown in FIG. 4, since the pressure introduced into the conduit portion 20c of the altitude compensation valve assembly must be a relatively low pressure, the compressed air source including the air pump such as employed in the embodiment of FIG. 3 is not employed. Instead thereof, the conduit portion 20c of the valve assembly 10 so far shown in FIG. 4 is connected to a passage 90 extending between the pipe 72 and the second intake port 57b of the control valve assembly 55 of the construction shown in FIG. 3. It will readily be seen that, when the low pressure present in the passage 90, which is in turn supplied to the conduit portion 20c of the altitude compensation valve assembly, exceeds the predetermined value, an excessive amount of the low pressure can be discharged to the atmosphere through the valve chamber 22 and then the bellows chamber 21 as hereinbefore described in connection with the operation of the altitude compensation valve assembly 10 with reference to FIG. 2.

Although the present invention has fully been described by way of example, it is to be noted that various changes and modifications are apparent to those skilled in the art. For example, the fluid-operated system according to the present invention ca be applied also to an exhaust recirculating system. Therefore, such changes and modifications are to be understood as included within the true scope of the present invention unless they depart therefrom.

What is claimed is:

1. A fluid-operated system including means for maintaining fluid pressure substantially constant during pressure changes in the ambient atmosphere, comprising:
   (a) a source of fluid under pressure;
   (b) a slave device operatively controlled by fluid being supplied from said fluid source;
   (c) passage means for transmitting fluid from said fluid source to said slave device;
   (d) a housing having a first chamber communicating with said passage means and a second chamber communicating with the atmosphere;
   (e) a normally biased closed valve operatively supported in said housing between said first and second chambers for permitting communication between said first and second chambers as a function of the degree of opening of the valve;
   (f) diaphragm means supported within said second chamber and responsive to changes in atmospheric pressure; and
   (g) a compression spring disposed between said valve and said diaphragm means, the biasing force of said compression spring varying with the response of said diaphragm means to changing atmospheric pressure, said compression spring and diaphragm means cooperating to maintain a substantially constant closing force on said valve during changes in atmospheric pressure and maintaining a substantially constant fluid pressure in said passage means.

2. The fluid-operated system of claim 1, wherein said pressure in said passage means is a positive pressure.

3. The fluid-operated system of claim 1, wherein said diaphragm means is constituted by a sealed bellows.

4. The fluid-operated system of claim 1 further comprising a flow-restricting orifice in said passage means and wherein said first chamber is in communication with the fluid in said passage means downstream of said orifice.

5. The fluid-operated system of claim 1, wherein the pressure introduced into the first chamber is a negative pressure.

* * * * *